United States Patent [19]

Panet

[11] Patent Number: 4,589,440

[45] Date of Patent: May 20, 1986

[54] DEVICE FOR CONTROLLING THE FLOWRATE OF A FLUID MORE PARTICULARLY A RADIOACTIVE FLUID

[75] Inventor: Michel Panet, Avon, France

[73] Assignee: Electricite de France (Service National), Paris, France

[21] Appl. No.: 588,951

[22] Filed: Mar. 13, 1984

[30] Foreign Application Priority Data

Mar. 22, 1983 [FR] France ............................... 83 04654

[51] Int. Cl.[4] .............................................. G05D 7/03
[52] U.S. Cl. .................................. 137/486; 137/487.5; 137/503
[58] Field of Search ................... 137/486, 487.5, 503, 137/494; 251/26, 30

[56] References Cited

FOREIGN PATENT DOCUMENTS 1033196 6/1966 United Kingdom .
2060140 4/1981 United Kingdom .

*Primary Examiner*—Alan Cohan

*Attorney, Agent, or Firm*—McCormick, Paulding & Huber

[57] ABSTRACT

The device comprises at least one nozzle (T), in combination with a regulating valve (VR). A detector (135) measures the flowrate of the fluid in the nozzle and controls a distributor (109) for selecting a static pressure take-off orifice from among a plurality of regularly staged orifices in a convergent section (101). The orifice is brought into communication with a chamber (127) of the regulating valve to control the position of a closure member (119) which uncovers to a varying degree the orifices of a cage (117). The displacement of a distributor (121) from one position (R) to another (S) converts the regulating function into a shut-off function by pressure effect, by applying a high pressure to the chamber (127). The total immersion of the closure member obviates the disadvantages of the rod and packing system of conventional valves, as well as those resulting from the radiation-sensitivity of the prior art pneumatic servo-mechanisms.

13 Claims, 8 Drawing Figures

FIG_1

FIG_2

FIG_5

FIG. 3

FIG_4

FIG_6

FIG_7

FIG. 8

DEVICE FOR CONTROLLING THE FLOWRATE OF A FLUID MORE PARTICULARLY A RADIOACTIVE FLUID

The present invention relates to a device for controlling the flowrate of a fluid and is intended more particularly for use in the radioactive fluid circuits of nuclear power stations.

In such circuits complete sealing-tightness must be provided. Moreover, the operation of the apparatus must not be affected by the conditions of irradiation, pressure and temperature resulting from an accident situation. Even in normal operation the pressure of the fluid to be shut off or regulated must be able to vary between values of the order of 0 to 180 bar, and its temperature between 20° and 340° C.

Hitherto the valve system for performing these regulating and shut off functions was formed by an enclosure comprising 2 elements (cap and body) assembled by a screwed or flanged mounting. The movement of the closure element and the stability of its position derived from the action of an electro-pneumatic positioner fixed to an arch connected fast to the cap and comprising a pneumatic servomotor producing the axial displacement of the operating rod extending through the cap.

The disadvantages of that design are a result of the break in the enclosure where the rod of the valve extends through. At that point sealing-tightness is produced solely by a packing block.

On the other hand, the frictional force of the packings on the operating rod impedes the operation of the regulating mechanism, since it disturbs its feed back.

Finally, servometers and their accessories (penumatic relays . . .) are highly sensitive to external radiation and temperature conditions, which cause them to age prematurely.

It is an object of the invention to obviate these disadvantages.

A first function of the apparatus according to the invention is the regulation of the flowrate of the fluid, with a view to maintaining the value of such flowrate (or if necessary the value of the pressure of the fluid at a given point) at a pre-set value.

The apparatus according to the invention can also be used as a member for shutting off the flow of fluid, this forming a second function of the apparatus according to the invention.

To this end the device comprises:
at least one nozzle having a convergent section comprising static pressure take-off means at a variable point in the convergent section;
co-operating with the nozzle, a regulating valve comprising a movable closure member;
means for varying the position of the closure member in dependence on the static pressure taken from the convergent section;
means for varying the static pressure take-off point in the convergent section in dependence on the flowrate or pressure of the fluid, so that any variation in the flowrate or the pressure around a set value causes a modification of the position of the closure member, resulting in an opposing modification of the flowrate of the fluid, to return the flowrate or the pressure to its set value.

More particularly, the means for varying the position of the closure member comprise means for applying to the closure member, in the opening direction, a force proportional to a static pressure taken upstream of the device; means for applying to the closure member, in the closing direction, a force proportional to the static pressure taken from the convergent section; and means for applying to the closure member a force compensating the static pressure taken upstream.

In other words, the invention proposes to associate at least one nozzle with a regulating valve. The difference in pressure between the area upstream of the device and a running point along the nozzle is used as the force for operating the closure member, the reaction on the latter being produced, for example, by a spring system.

This device allows a regulation of the opening of the valve which results in the regulating function, by the action of an autonomous control loop which re-establishes the pre-set flow value.

In a first embodiment the nozzle comprises a plurality of pressure take-off lines, all the pressure take-offs disposed at the same level of the convergent section communicating with an annular chamber which is connected to one of the inlets of a multi-way distributor.

In a second embodiment the device comprises means for the relative displacement of the convergent section and the static pressure take-off which comprise a magnetic coupling on either side of a non-magnetic wall of the body of the nozzle.

The device also advantageously comprises means for selectively preventing the transmission to the closure member of the static pressure taken from the convergent section, and for applying to the closure member, in the closing direction, a force proportional to the static pressure taken upstream of the device and for applying to the closure member, in the opening direction, a force proportional to the static pressure taken downstream of the device, so as to isolate the upstream and downstream zones of the device.

This arrangement produces a shut off function by mere pressure effect, controlled manually or remote-controlled and applied to the closure member.

The regulating and sectioning device according to the invention has the following advantages:
highly reliable sealing tightness (more particularly because of the complete immersion of the closure member in the radioactive fluid), and absence of parasitic friction caused by the rod packing which disturbs the regulation.
Robust resistance to accidental radiation conditions, as a result of the elimination of the elastomeric diaphragms of the conventional penumatic servo-motors, and high temperature resistance, due to the elimination of the conventional penumatic relays.
Reduced maintenance, due to the absence of packings;
stability of regulation, due to the use of a hydraulic dampener integral with the diffusor (calibrated conduits);
Possibility of closure in the upstream/downstream direction by pressure effect.
The closure member is subjected only to static (not dynamic) pressures, since it is not in direct contact with the direction of the jet: precision and stability of regulation are improved proportionately.

Other features and advantages of the invention will become apparent from a study of the following detailed description of two embodiments, with reference to the accompanying drawings, in which:-

Referring to the figures, the device according to the invention comprises a nozzle T which, in the configuration illustrated, is mounted upstream of a regulating valve VR of cage type. The device according to the invention also comprises other configurations combining the nozzle T and the valve VR, which comprise all assemblies in series, with branching of the nozzle T from the valve VR, and all assemblies in which the nozzle T and the valve VR belong to distinct hydraulic circuits.

Figure 1:
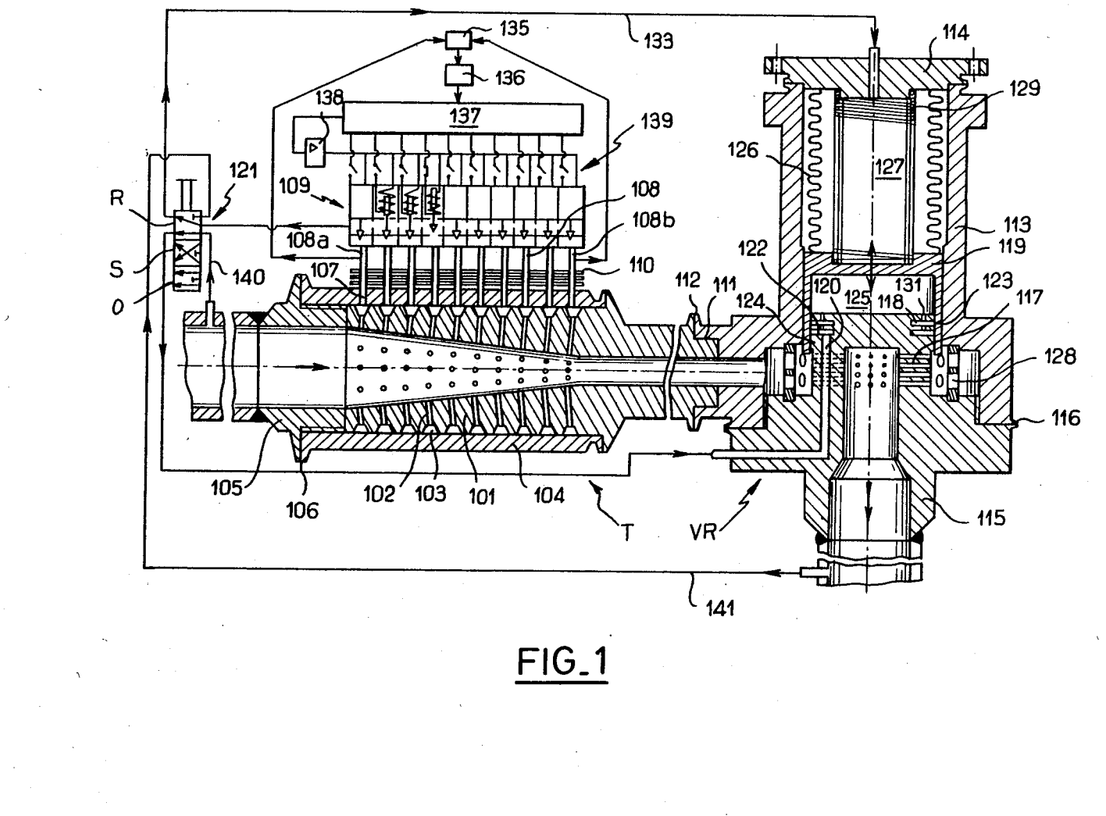
FIG. 1 is a section of a first embodiment of a device in accordance with the invention.

According to the first embodiment, shown in FIG. 1, the nozzle T comprises a convergent section 101 having pressure take-off conduits 102 regularly distributed in the axial and circumferential directions and discharging into annular chambers 103.

The sealing between the chambers is provided by a cylindrical sleeve 104. A high contact pressure of the sleeve 104 on the convergent section 101 ensures such sealing-tightness. This can be produced by a special technique which involves mounting the sleeve 104, heated to an elevated temperature, onto the convergent section 101 which has been greatly cooled.

An end member 105 screwed into the sleeve 104 enables the upstream piping to be connected to the nozzle. Sealing between the members 104 and 105 is provided, for example, by the welding of machined lips 106.

Extending through the sleeve 104 are radial conduits 107 which each extend between a respective annular chamber 103 and a respective insertion conduit 108 connected to a respective one of the inlets of a distributor 109. A heat exchanger 110 with fins and heat duct is disposed on the conduits 108 to prevent the distributor 109 becoming overheated.

The nozzle T is fixed to the regulating valve VR by a screwed or flanged assembly 111. This connection is sealed by the welding of machined lips 112.

The regulating valve comprises a completely sealing-tight enclosure formed by a body 113 to which a cap 114 and a diffusor 115 are attached. The sealing between these elements is produced by the welding of machined lips 116 and they are assembled via bolts or by screwing.

The diffusor includes a cage 117, preferably for the association of the nozzle T with the regulating valve VR of the serially mounted kind, whose orifices have a section which diminishes when moving along the axis of the cage in a direction opposite to the flow; this arrangement, which is the opposite of that most often found in conventional regulating valves, enables a convex characteristic of flow of the valve to be obtained for this configuration, such characteristic ensuring, having regard to the linear characteristic of the spring, a stable equilibrium around the set point fixed by the regulating system.

That end of the diffusor 115 which fits into a closure member 119 is formed with one or more annular grooves 118. A conduit 120 extends through the diffusor 115 and one end communicates with an outlet of a distributor 121 with 5 orifices and 3 positions (position R: regulation; position S: shut off; position O: opening), whilst the other end of the conduit 120 communicates with the lower annular groove 122. A second cage 128 is fitted between the body 113 and the diffusor 115 so as to reduce the forces produced by the jet leaving the nozzle on the closure member and having more particularly a tendency to bias the closure member radially, pitting also being thus reduced. The closure member 119 is guided axially by the diffusor 115, which is itself perfectly centred in relating to the body 113. The frictional surfaces of the fitting 123 have a hard lining, which can be a stellite.

A segment 124 can be placed beneath the groove 122 to improve the piston effect of the diffusor-closure member system. The closure member 119 co-operates with the diffusor 115 to define a first chamber 125 which contains the pressure transmitted by the conduit 120 via the calibrated orifices 131.

Bellows 126, welded at one end to the cap 114 and at the other to the closure member 119, define a second chamber 127 communicating either with the distributor 109 and the insertion conduit 108 selected by the distributor 109 (regulating function: position R of the distributor 121), or with an upstream pressure take-off conduit 140 (shut off position S).

A spring system 129 urges the closure member 119 back into its closing position.

The distributor 109 is formed by a series of single-passage electric valves supplied by a respective conduit 108. The regulating loop is made up of a detector 135 which converts the difference in pressure between two points situated upstream and downstream of the nozzle (for example, the end insertion conduits 108a and 108b) into a current which is proportional to such difference. An analog regulator 136 with digital display is set to the required value of such difference. The set value is established taking into account the nozzle flow characteristic.

If there is a variation in the flowrate, the differential pressure observed by the detector 135 differs from the set value, and the regulator 136 produces a current signal proportional to the drift which is transmitted to a pre-programmed microprocessor 137 whose logic functions allow a delayed scanning of the distributor 109 by opening or closing the relay contacts 139, via an amplifier 138 of the microcurrents of the microprocessor 137.

As a result, therefore, due to the different pressures transmitted to the chamber 127 by the conduit 133 (connecting, via the electric valve 121, the chamber 127 to the insertion conduit selected by the microprocessor 137) the closure member 119 moves until the flow passage through the apparatus returns to the value corresponding to the set value displayed by the regulator 136.

In certain cases the delay in scanning may set up a periodic flow oscillating around the flowrate set value, every time that the position of the closure member for the set flowrate would require the transmission to the chamber 127 of a pressure intermediate between those in two adjacent annular chambers 103.

As a variant, the operation of the valve can be controlled not by the flowrate of the fluid, but by the pressure at a particular point. In this case the pressure detector 135 is not a detector of differential pressure between upstream and downstream of the convergent section (the differential pressure representing the flowrate of the fluid), but an absolute pressure detector which measures the static pressure at only one point on the circuit.

The closing of the valve by pressure effect is obtained by manual control or remote control of the distributor 121 (position S), which permutates the pressures supplied to the chambers 125 and 127 and isolates the distributor 109 and the control loop described above. The second chamber 127 is subjected to the high pressure prevailing upstream (supplied via the conduit 140), the first chamber 125 being subjected to the low pressure prevailing downstream of the device (supplied via a conduit 141).

The opening of the valve is facilitated by passing to the position O of the distributor 121, which permutates the pressures of the chambers 125 and 127.

Figure 2:
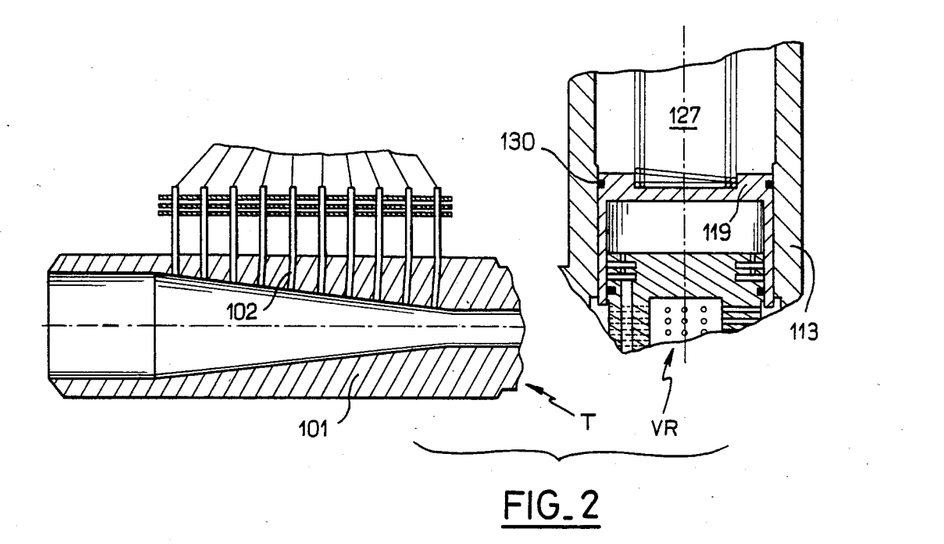
FIGS. 2 and 3 illustrate a certain number of variants of the device shown in FIG. 1.

FIG. 2 illustrates certain variant embodiments which can be applied independently of one another: in the first place, the nozzle 101 is a monoblock one; it bears not a plurality of lines regularly distributed in an axial plane, but a single line of pressure take-off conduits 102 aligned in the axis of the nozzle. The sealing tightness of the chamber 127, supplied by the distributor and bounded by the closure member 119 and the body 113, is provided by a segment joint 130.

Figure 3:
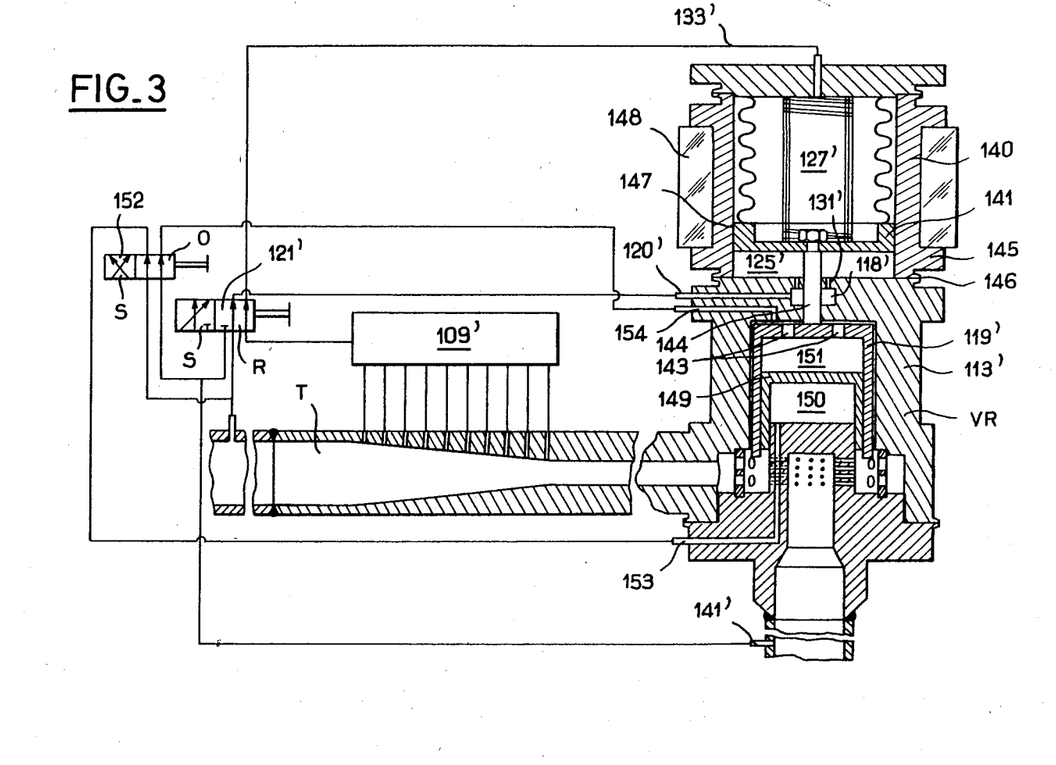

FIG. 3 shows another variant, in which the regulating valve is equipped with a hydraulic motor attached to the body 113' by a flanged assembly 145 with welding of the machined lips 146.

A piston 141 separates the two chambers 125' and 127'. The chamber 125' receives the pressure of the pilot circuit via line 120' which communicates via the body 113' with annular groove 118' which communicates with the chamber via calibrated orifices 131' which produce a dampening effect.

A shut off valve element 149 separates two chambers 150 and 151.

The closing of the valve by pressure effect is produced by manual control or remote control of the first distributor 121' (position S) which isolates the distributor 109' and the control loop, and by the control of the second distributor 152 (position S) which permutates the pressure supplied to the chambers 150 and 151. The chamber 151 is subjected to the high pressure prevailing upstream of the device (supplied by the conduit 154), the chamber 150 being subjected to the low pressure prevailing downstream of the device (supplied by the conduit 153).

The opening of the valve is performed by the manual control or remote control of the distributor 152 (position O), which permutates the pressures of the chambers 150 and 151.

The regulation of the flowrate is obtained by manual control or remote control of the distributor 121' (position R), which transmits to the chamber 127' the pressure selected by the distributor 109', without altering the pressure of the chamber 125' taken upstream of the device.

A hard coating 147 can be applied to the frictional surfaces of the picton 141 and the cylinder 140 over the height of piston travel.

Cooling fins 148 and a heat duct are attached to the cylinder 140, enabling the temperature of the hydraulic motor to be reduced.

The closure member 119' is connected to the piston 141 via an operating rod 144 preferably articulated at each end to the closure member and the piston via appropriate assemblies.

A line 143 extends through the closure member 119', allowing equality in the pressures on either side of the closure member.

This structure makes the closure member completely insensitive to the dynamic pressure of the fluid, even if the closure member-diffusor contact surfaces become worn.

Figure 4:
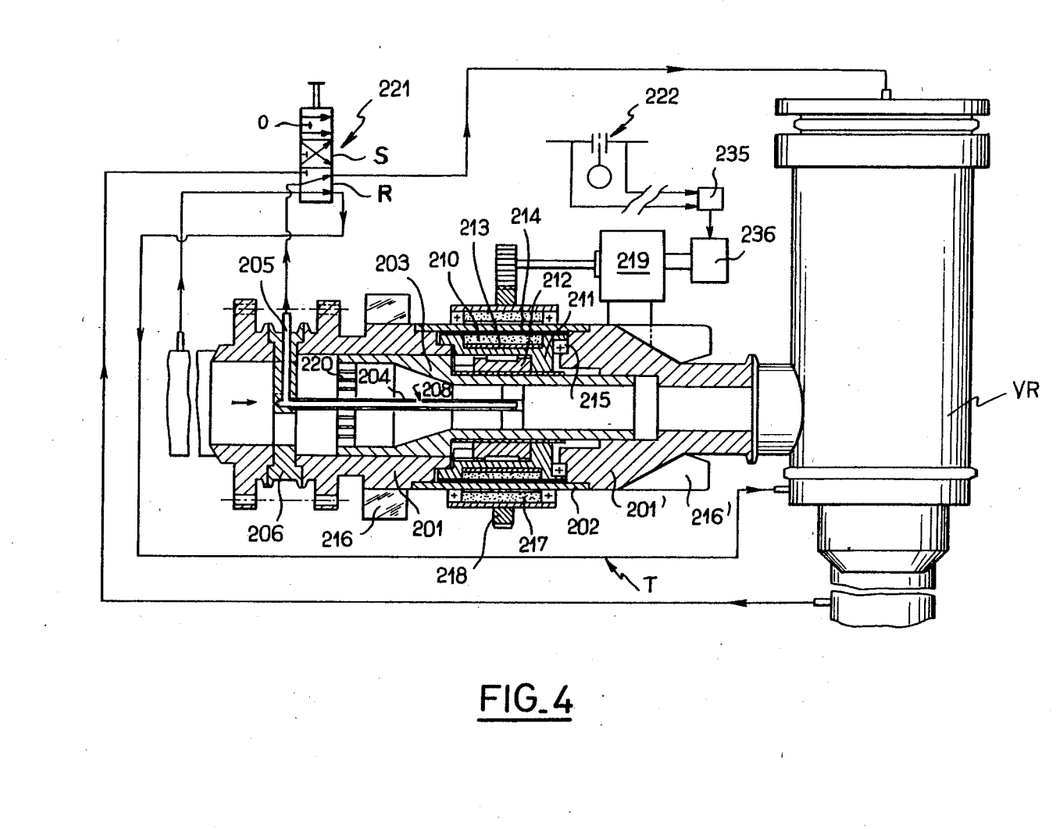
FIG. 4 is a partially sectioned view of a second embodiment of a device in accordance with the invention.

FIG. 4 shows a second embodiment.

In this embodiment the body of the nozzle T is formed by two guide elements 201, 201' welded to a jacket 202. Convergent section 203 slides in the guide elements 201, 201', in relation to which a tube 204 is fixed coaxially. A conduit 205, extending through a member 206 required for the mounting of the tube 204, transmits the pressure from the orifice 208 to the regulating valve VR (identical with that of the first embodiment) when the distributor 221 allows this. A flow straightener 220 can be attached to the inlet of the convergent section.

The device permitting the displacement of the convergent section is fully included in the body of the nozzle. It comprises a magnetic part and a motion-converting mechanism.

The magnetic part inside the nozzle enables the nozzle to be connected to the external control. The magnetic part is formed by permanent magnets 210, with cobalt and a metal of rare earths, connected fast to a cylindrical element 211 which transmits the rotary motion to a screw with rollers 212.

The magnets are attached to a mild steel cylindrical element 213 which channels the magnetic field. They are protected from the ambient fluid by a thin envelope of non-magnetic steel 214. The air gap is the wall 202 of the enclosure (a boron-doped steel has advantageous magnetic and mechanical properties, allowing negligible magnetic leakages in the air gap).

The rotation of the assembly formed by the magnets and the screw with rollers is guided by the element 211 bearing against the element 201', a ball race 215 retaining the assembly axially.

A system of fins 216, 216' is disposed on the elements 201, 201' of the body of the nozzle; the fins can carry a heat duct, so as to limit the temperature of the magnets.

The external force transmitted through the wall is produced by an assembly of rotary magnets 217 outside the enclosure. The external magnets are disposed on a toothed wheel 218 which is driven by a stepping motor 219.

The regulating loop is formed by a detector 235, which converts the difference between the pressures taken on either side of a flowmeter 222, mounted on the piping upstream of the nozzle, into a current proportional to such difference. An analog regulator with incorporated valve positioner 236 is regulated to the set value of such difference. The set value is established from the calibration curve of the flowmeter (a manometer can be substituted for the flowmeter, if the pressure rather that the flowrate is to be controlled).

In case of a variation in the flowrate (or the pressure) of the fluid, the drift in the difference in pressure of the flowmeter (or the pressure of the manometer) observed by the detector 235 produces the rotation, in a direction which is a function of the sign of the drift, of the motor 219 as a result of the action of the regulator 236. The result is a variation in the pressure in the orifice 208, due to the displacement of the convergent section 203; this variation in pressure is transmitted to the upper chamber of the regulating valve and causes the displacement of the closure member until the set flowrate (or pressure) returns.

Figure 5:
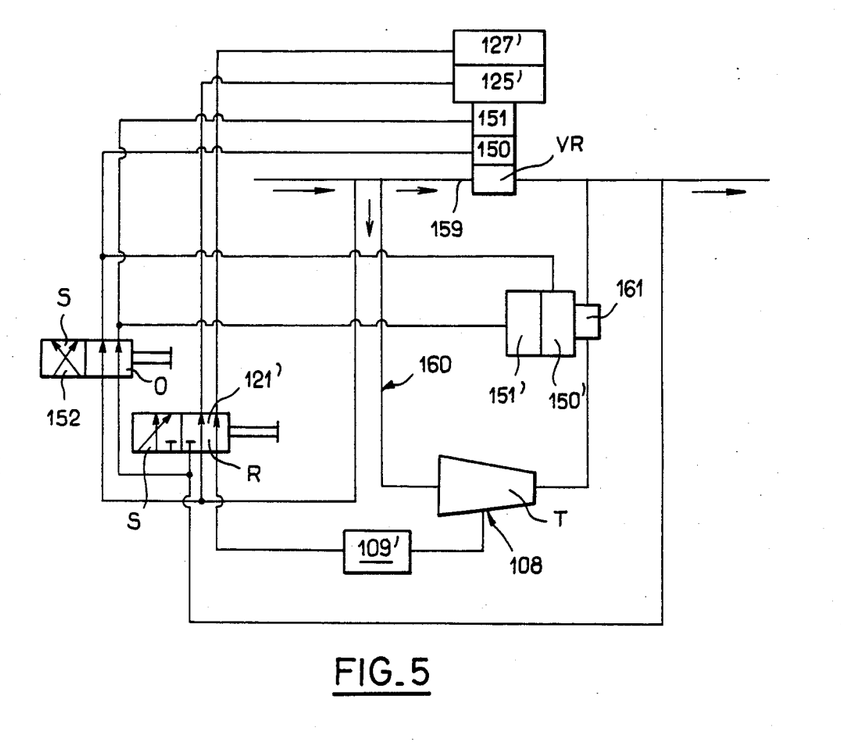
FIG. 5 shows another configuration of the nozzle-regulated valve assembly.

FIG. 5 shows another configuration combining the regulating valve VR and the nozzle T: The nozzle T is disposed in a circuit 160 which by-passes the main circuit 159 containing the regulating valve VR. A shut off valve member 161 piloted by the distributor 152 is so mounted on the by-pass circuit 160 as to ensure the shut off function of the device according to the invention.

Figure 6:
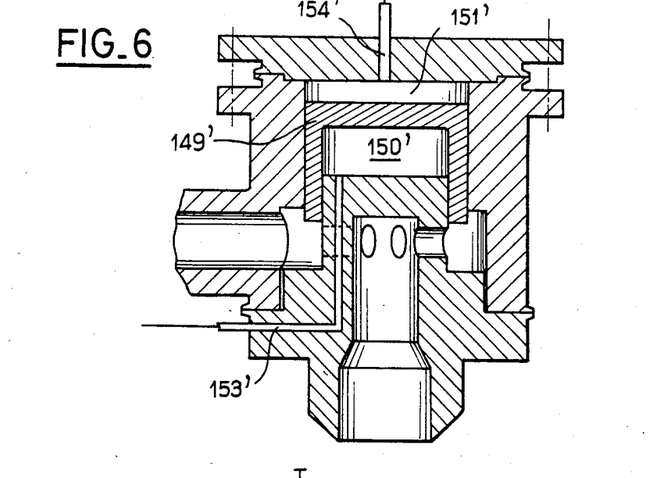
FIG. 6 shows an embodiment of a shut off valve member.

FIG. 6 shows an embodiment of the valve member 161 which can operate by using any drop in hydraulic pressure, more particularly the drop specific to it, via the agency of close volumes 150' and 151' whose increase causes the displacement of the valve member 149' in the closing and opening direction respectively.

The regulating and shut off functions are obtained by the piloting of the pressures of chambers 125', 127', 151, 150, 151' 150' in the sequence and by the means already disclosed with reference to FIG. 3.

Figure 7:
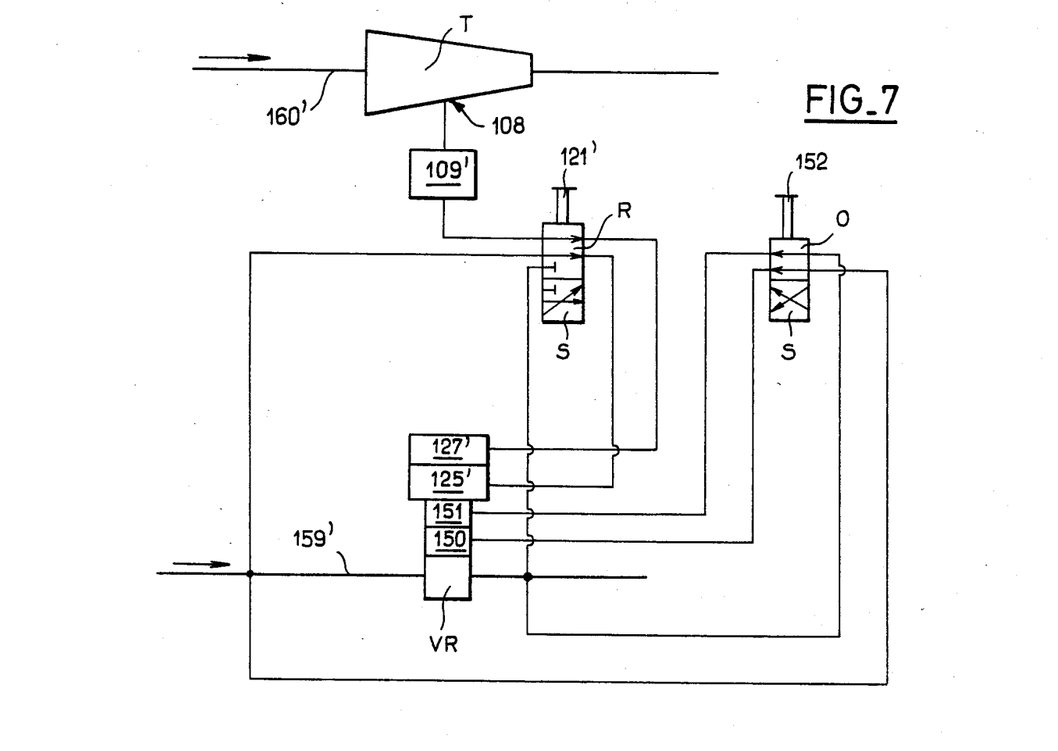
FIGS. 7 and 8 show two other configurations of the nozzle-regulated valve assembly.

FIG. 7 shows another configuration combining the regulating valve VR and the nozzle T. The nozzle T is disposed on a circuit 160' distinct from the circuit 159' bearing the regulating valve VR.

The regulating and shut off functions are obtained by the piloting of the pressures of the chambers 125', 127', 151, 150 in the sequence and by the means already disclosed with reference to FIG. 3.

If such a function is required, this configuration enables an interlocking system to be set up between the flows of the distinct circuits 159' and 160'. It also enables two circuits 159' and 160' to be used, through which fluids flow in the gaseous and liquid states respectively.

Figure 8:
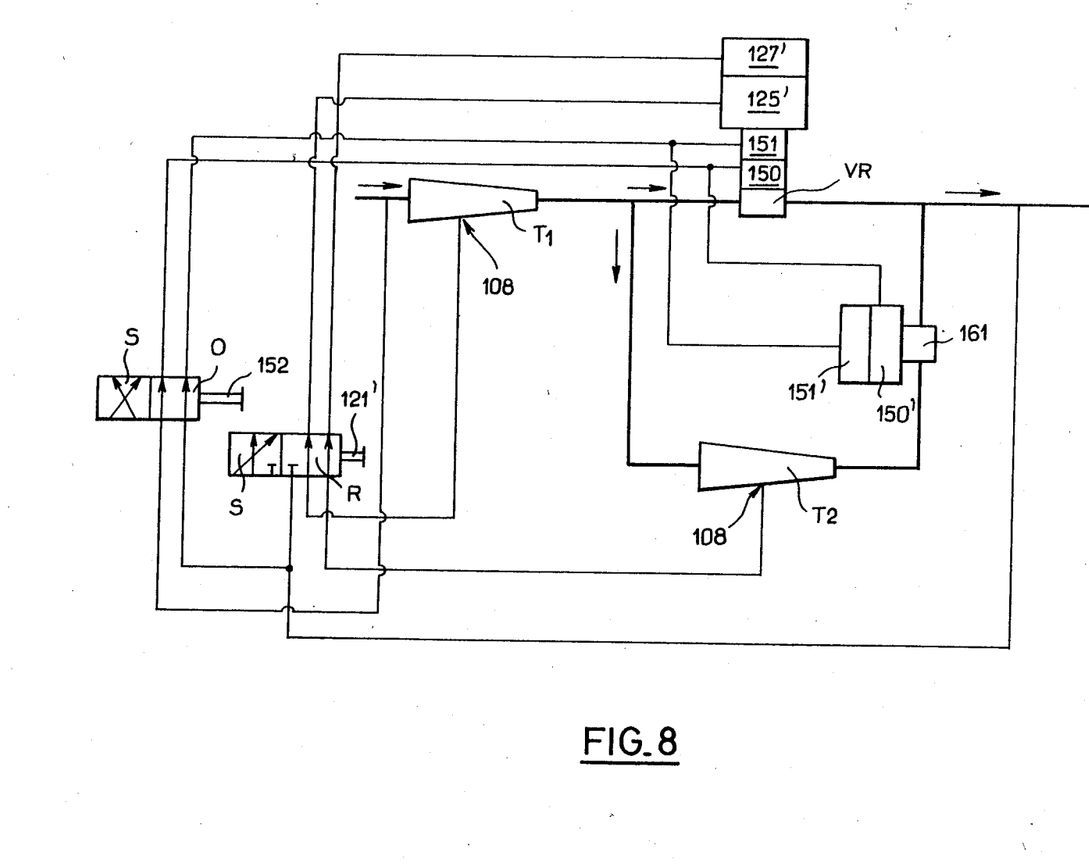

FIG. 8 shows another combination combining the regulating valve VR with a plurality of nozzles T1 and T2 disposed respectively in series and in parallel with the regulating valve VR.

This configuration enables the spring system 129 already disclosed with reference to the arrangements illustrated in FIG. 1 to be eliminated.

The regulating and shut off functions are obtained by the piloting of the pressures of the chambers 125', 127', 151, 150, 151' 150' in the sequence and by the means already disclosed with reference to FIG. 3, with the exception of chamber 125', which communicates with the nozzle T1. The chamber 127' communicates with the nozzle T2 for regulating purposes, and with the downstream pressure of the device for shut off purposes.

I claim:

1. A device for controlling the flowrate of a fluid, more particularly a radioactive fluid, comprising:
   at least one nozzle (T) having a convergent section with static pressure take-off means at a variable point in the convergent section;
   co-operating with the nozzle, a regulating valve (VR) having a movable closure member; means for varying the position of the closure member in dependence on the static pressure taken from the convergent section;
   means for varying the static pressure take-off point in the convergent section in response to a condition of the fluid dependent upon its pressure, so that any variation in said condition around a set value causes modification of the position of the closure member, resulting in an opposing modification of the flowrate of the fluid, to return said condition to its set value, the closure member being as a result operated by the use of the drop in pressure produced by the device.

2. A device according to claim 1, characterized in that the means for varying the position of the closure member comprise means for applying to the closure member, in the opening direction, a force proportional to a static pressure taken upstream of the device; means for applying to the closure member, in the closing direction, a force proportional to the static pressure taken from the convergent section; and means for applying to the closure member a force compensating the static pressure taken upstream.

3. A device according to claim 2 characterized in that it also comprises means for selectively preventing the transmission to the closure member of the static pressure taken from the convergent section, and for applying to the closure member, in the closing direction, a force proportional to the static pressure taken upsteam of the device and for applying to the closure member, in the opening direction, a force proportional to the static pressure taken downstream of the device, so as to produce a sectioning of the upstream and downstream zones of the device.

4. A device according to claim 2, characterized in that the regulating valve comprises, inside a sealingtight enclosure:
   a diffusor provided with a cage having, in a number of axially staged planes, a plurality of radial orifices;
   a closure member of the diffusor which, by an axial movement, enables a varying number of orifices of the cage to be covered, so as to vary the flowrate of the fluid passing through the diffusor;
   means for connecting to the upstream static pressure take-off a first chamber the volume of which is increased in the opening direction; means for connecting to the variable static pressure take-off of the convergent section a second chamber whose volume is increased in the closing direction.

5. A device according to claim 2 characterized in that the means for applying to the closure member a force compensating the static pressure in the closed volume whose increase causes opening comprise a spring exerting a force transmitted to the closure member in the closing direction.

6. A device according to claim 4 characterized in that the means for connecting the first chamber to the upstream static pressure take-off also comprise at least one calibrated orifice.

7. A device according to claim 1 characterized in that the nozzle comprises at least one line of peripheral pressure take-offs staged along the convergent section and each connected to the inlet of a multi-way distributor controlled by means for measuring the flowrate or pressure of the fluid and comparing the measured value with the set value.

8. A device according to claim 7 characterized in that the nozzle comprises a plurality of pressure take-off lines, all the pressure take-offs disposed at the same level of the convergent section communicating with an annular chamber which is connected to one of the inlets of the multi-way distributor.

9. A device according to claim 1 characterized in that it comprises means for the relative displacement, inside the body of the nozzle, of the convergent section in relation to a single pressure take-off.

10. A device according to claim 9 characterized in that the means for the relative displacement of the convergent section and the static pressure take-off comprise a magnetic coupling on either side of a non-magnetic wall of the body of the nozzle.

11. A device according to claim 10, characterized in that the magnetic coupling comprises:
   outside the body of the nozzle, a motor for rotating at least a first permanent magnet;
   inside the body of the nozzle, at least a second permanent magnet, which co-operates with the first permanent magnet and drives a mechanism for converting the rotary movement into a relative axial traversing movement of the pressure take-off and the convergent section.

12. A device according to claim 4, characterized in that the regulating valve comprises, inside a sealingtight enclosure:
   a shut-off valve member, distinct from the closure member, whose displacement causes the opening and closing of the regulating valve;
   means for connecting to the upstream static pressure take-off of the device a first chamber, the increase in whose volume causes a movement of the valve members in the opening direction;
   means for connecting to the downstream static pressure take-off of the device a second chamber, the increase of whose volume causes a movement of the valve member in the closing direction; also, outside said enclosure:
   means for permutating the static pressures of the first and second chambers;
   means for selectively preventing the transmission to the chamber of the static pressure taken from the convergent section, in order to apply to the closure member, in the opening direction, a force proportional to the static pressure taken upstream of the device, and to apply to the closure member, in the closing direction, a force proportional to the static pressure taken downstream of the device, so that the closure member covers only a portion of the orifices of the cage when the valve closes the regulating valve;
   a hydraulic motorized system for moving the closure member, the system being cooled by fins and a heat duct.

13. A device according to claim 4 wherein a single nozzle is mounted in series with the regulating valve, characterized in that the radial orifices of the cage have a decreasing section, moving along the axis of the cage in the direction opposite from the flow.

* * * * *